United States Patent [19]

Ford

[11] Patent Number: 5,449,190
[45] Date of Patent: Sep. 12, 1995

[54] TRAILER PIN PULLER

[76] Inventor: William G. Ford, 7020 Metropolis Lake Rd., West Paducah, Ky. 42086

[21] Appl. No.: 163,529

[22] Filed: Dec. 9, 1993

[51] Int. Cl.$^6$ .................... B62D 53/06; B60G 5/06
[52] U.S. Cl. ..................... 280/407.1; 280/438.1; 280/149.2; 280/80.1; 280/433; 180/209; 254/98
[58] Field of Search ............ 280/515, 436, 437, 438.1, 280/441, 430, 407.1, 405.1, 504, 149.2, 80.1, 433, 638, 81.1, 81.5; 180/209; 254/98; 267/155, 156, 157

[56] References Cited

U.S. PATENT DOCUMENTS

| 1,265,705 | 5/1918 | Litchfield | 280/149.2 X |
|---|---|---|---|
| 1,314,498 | 9/1919 | Bower | 280/149.2 X |
| 1,367,094 | 2/1921 | Ragona | 254/231 |
| 2,709,079 | 5/1955 | Bubb et al. | 267/157 X |
| 2,818,272 | 12/1957 | De Lay | 280/638 |
| 2,831,735 | 4/1958 | Bennett et al. | 384/42 |
| 3,177,002 | 4/1965 | Schmidt | 280/149.2 X |
| 3,319,488 | 4/1965 | Bentley et al. | 254/98 X |
| 3,345,038 | 10/1965 | Taylor | 254/98 X |
| 4,251,089 | 2/1981 | Skaggs | 280/433 |
| 4,286,797 | 9/1981 | Mekosh, Jr. | 280/149.2 |
| 4,641,846 | 2/1987 | Ehrhart | 280/149.2 |
| 4,838,566 | 6/1989 | Baxter et al. | 280/149.2 |
| 4,944,522 | 7/1990 | Hart | 280/149.2 |

Primary Examiner—Margaret A. Focarino
Assistant Examiner—F. Zeender
Attorney, Agent, or Firm—Richard C. Litman

[57] ABSTRACT

A detached pin pulling accessory for removing pins locking a bogie to a trailer chassis. The puller is intended for use with a trailer having pin pulling equipment which is intended to be pulled by hand. The pin pulling equipment has a handle extending toward the side of the trailer, on which a pulling force is exerted by a first person while a second person rocks the trailer by moving the tractor. The inventive accessory clamps to the trailer and engages the pulling handle of the apparatus, and is self-supporting once these connections are made. An integral crank is wound, which places tension on a spring acting on the pulling handle. The spring maintains tension on the pin pulling equipment without requiring the first person to be present. Thus, releasing pins from a trailer is rendered a one-person task by the novel accessory. The novel accessory requires no external power, such as pneumatic or electrical, and is portable from vehicle to vehicle.

14 Claims, 1 Drawing Sheet

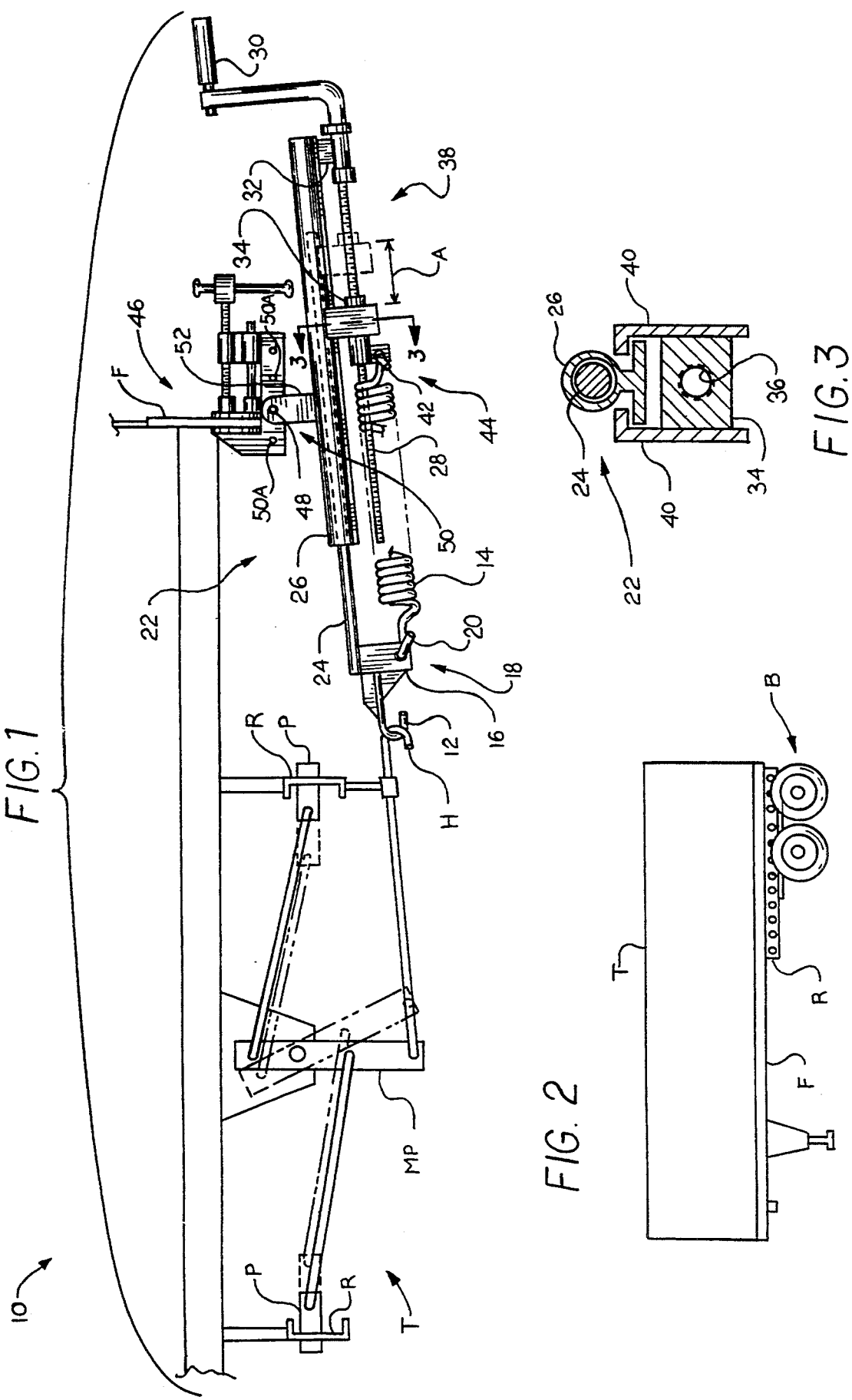

TRAILER PIN PULLER

BACKGROUND OF THE INVENTION

1. Field of the Invention

The present invention relates to a tool for imposing tension on pre-existing equipment for pulling pins from the connection of a bogie to an associated vehicle chassis.

2. Description of the Prior Art

Adjustment of trailer weight, as by repositioning a bogie relative to the trailer chassis, is well known. Apparatus has been proposed in the prior art for withdrawing pins locking the bogie to the chassis. Typical prior art arrangements incorporate a lever having a pivot point, there being arms extending laterally from the lever from opposite sides of the pivot point. One or more springs may be provided to bias the lever such that the arms project outwardly from the pivot point, each urging a corresponding pin into aligned holes formed in the trailer chassis and in the bogie.

U.S. Pat. No. 4,286,797, issued to George Mekosh Jr., et al. on Sep. 1, 1981, describes a system which is spring biased to maintain pins in their operative position, locking a bogie to its associated chassis, and employing fluid pressure to counteract the bias, thus extracting the pins. The bogie is then repositioned on the trailer chassis, and pins are replaced in new locations.

Similar devices, although hand operated, are seen in U.S. Pat. Nos. 2,818,272, issued to Manford S. De Lay on Dec. 31, 1957; 2,831,735, issued to John C. Bennett et al. on Apr. 22, 1958; 4,838,566, issued to Bobby G. Baxter et al. on Jun. 13, 1989; and 4,944,522, issued to Bobbie M. Hart on Jul. 31, 1990.

U.S. Pat. No. 4,641,846, issued to Leonard M. Ehrhart on Feb. 10, 1987, discloses a system for releasing the brake system of a trailer when pins holding a bogie to the chassis is in proper, operative condition. Proper orientation of the bogie and trailer chassis releases a valve which maintains braking action to the trailer.

The devices of Mekosh, Jr. '797 and Hart '522 incorporate pneumatically powered servos or the like for rendering the lever based pin puller operable by one person. In each respective case, the pneumatic system is integral to the trailer.

An example of a crank operated tool for exerting a pulling force is seen in U.S. Pat. No. 1,367,094, issued to Vincent Ragona on Feb. 1, 1921. The tool has no spring maintaining the pulling force, nor a clamp for attachment to an associated object.

None of the above inventions and patents, taken either singly or in combination, is seen to describe the instant invention as claimed.

SUMMARY OF THE INVENTION

The present invention is directed to a separate, detachable, portable tool for providing a pulling force on a handle or arm of a pre-existing pin pulling device provided integrally with a vehicle trailer. The tool has a clamp for attachment to the trailer at a lateral flange thereof. A screw mechanism is cranked to place a spring under tension, after the tool engages the pulling handle of the pre-existing device by hooking thereto. The tool is held in place by the clamp and the hooked engagement of the pulling handle, and the spring maintains a pulling force acting on the pulling handle.

The tool thus replaces one of two persons who would have been required to accomplish chassis adjustment of the bogie. The tool requires no power, and is formed from commonplace components. It is light enough so that when detached from a trailer, it can be transported from trailer to trailer.

Accordingly, it is a principal object of the invention to provide a pulling tool for maintaining pulling force on the handle of a pin pulling equipment, which tool is separate from the trailer and from the pin pulling equipment.

It is another object of the invention to provide a manually operated and powered pulling tool.

It is a further object of the invention to provide a pulling tool which readily attaches to and is readily removable from a trailer.

Still another object of the invention is to provide a pulling tool which is self-supporting on a trailer when installed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an environmental, side elevational view of the invention, looking from beneath and in front of a trailer.

FIG. 2 is a side elevational view of a trailer, illustrating the environment of the invention, drawn to reduced scale.

FIG. 3 is a cross sectional detail view taken along line 3—3 of FIG. 1, drawn to enlarged scale.

Similar reference characters denote corresponding features consistently throughout the attached drawings.

DETAILED DESCRIPTION OF THE PREFERRED EMBODIMENT

The novel pulling tool 10 is seen attached to a vehicle trailer T in FIG. 1. Many trailers are provided with a manual pin puller MP for adjusting the position of a bogie thereto. Manual pin puller MP is intended to have a person pull thereon while a second person operates an associated tractor (not shown), jockeying the trailer back and forth. Jockeying the trailer frees pins P from being bound in their respective holes, as will occur due to dirt, rust, and distortion of the rails R bearing these holes. The engaged position of pins P and corresponding positions of manual pin puller MP are shown in solid lines, and retracted position of pins P and respective corresponding positions of manual pin puller MP are shown in broken lines.

A trailer T is illustratively shown in FIG. 2. Bogie B is moved by removing pins P (see FIG. 1) from holes, repositioning bogie B, and reinserting pins P. Of course, rails R will be understood to include rails formed in the trailer and cooperating, parallel rails formed in bogie B.

Returning to FIG. 1, pulling tool 10 engages handle H provided to enable a human operator to pull thereon, and also clamps to a flange F commonly formed in most commercial over-the-road trailers. A hook 12 connects to a spring 14 provided as part of pulling tool 10. Connection is indirect, as hook 12 is secured to a tab 16. Tab 16 has a hole 18 enabling a free end 20 of spring 14 to pass therethrough, thus engaging tab 16.

A guide member 22, comprising telescoping male and female members 24,26, attaches to a screw 28. Screw 28 is turned by a cranked handle 30 fixed to guide member 22, as by tab 32. When handle 30 is turned, screw 28 rotates and forces a screw block 34 to move axially therealong. Screw block 34 has a threaded hole 36 cooperating with threads 38 formed in screw 28. Screw 28 first imposes the tensile force acting on manual pin puller MP, and spring 14 maintains this force.

As best seen in FIG. 3, screw block 34 also has projections 40 engaging guide member 22, preventing rotation of screw block 34 in lockstep with screw 28, and captively retaining screw block 34 in sliding relation to guide member 22. Again referring to FIG. 1, since screw 28 is immobilized with respect to axial motion relative to guide member 22 at tab 32, screw block 34 must respond to rotation of screw 28 by migrating axially therealong.

Spring 14 is connected at its other end 42 to screw block 34 by engagement of hole 44. Therefore, when screw 28 is turned, screw block 34 migrates axially along screw 28, as along a distance of travel generally indicated by arrow A, and spring 14 is stretched or relaxed accordingly. Guide member 22 maintains hook 12, spring 14, and screw 28 in linear alignment.

In order to use pulling tool 10, spring 14 is first extended sufficiently to enable both easy engagement of handle H by hook 12, and attachment of pulling tool 10 to flange F by a screw clamp 46. Screw clamp 46 is an ordinary clamp, such as a vice. Manual pin pullers may be made in different configurations, so that travel of screw block 34 may be insufficient to enable easy attachment of pulling tool 10 to trailer T. In the latter case, screw clamp 46 may be repositioned by removing a pin or bolt 48 from a hole 50 formed in screw clamp 46, realigning screw clamp 46 with tab 52 formed integrally with guide member 22, and reinserting bolt 48 in a new hole 50A. It should be noted that screw clamp 46 pivots about bolt 48, enabling pulling tool 10 to accommodate different angles of inclination which may be required to attach to manual pin pullers of different configurations.

Once installed in the manner thus described, pulling tool 10 is self-supporting on trailer 10. Screw 28 is then turned until spring 14 exerts a pulling force on handle H. A user who has installed and adjusted pulling tool 10 may then leave the same installed and maintaining tensile force bearing on handle H, and turn his or her attention to operating the tractor.

Tensile force maintained by spring 14 on lever L will cause pins P to withdraw from rails R during jockeying of trailer T. Pulling tool 10 is then relaxed by turning screw 28, and is removed from trailer T. Bogie B (see FIG. 2) is then adjusted as desired, and pins P are reinserted in appropriate holes.

Thus, readily operated pulling tool 10 is usable to exert and maintain a tensile force on the handle of a manual pin puller. Pulling tool 10 cooperates with the handle and a flange provided on most trailers, and is self-supported thereon, and thus need not be attended by a human operator during use. Pulling tool 10 is readily removed from the trailer when its role is fulfilled, and is sufficiently small and light as to be readily portable. Thus, the same pulling tool 10 is usable on different trailers.

It will be appreciated that variations on the novel pulling tool 10 are possible without changing operation thereof. For example, holes 50,50A may be formed in guide member 22, with tab 52 20 being formed in screw clamp 46. It is to be understood that the present invention is not limited to the sole embodiment described above, but encompasses any and all embodiments within the scope of the following claims.

I claim:

1. A pulling tool for maintaining a pulling force on the handle of a manual pin puller of a vehicle trailer, said pulling tool comprising:

means for engaging the handle of the manual pin puller;

means for imposing a tensile force on the handle of the manual pin puller, wherein said tensile force bears on said means for engaging the handle of the manual pin puller;

a spring for maintaining said tensile force on the handle of the manual pin puller, said spring bearing on said means for engaging the handle of the manual pin puller; and a clamp for pivotally attaching the pulling tool to the vehicle trailer.

2. The pulling tool according to claim 1, said means for engaging the handle of the manual pin puller comprising a hook.

3. The pulling tool according to claim 1, said means for imposing said tensile force on the handle of the manual pin puller comprising a screw and an associated screw block, said screw block operably connected to said means for engaging the handle of the manual pin puller.

4. The pulling tool according to claim 1, further including means for selectively attaching said clamp at different points thereto.

5. The pulling tool according to claim 1, further including a guide member for maintaining said means for engaging the handle of the manual pin puller, said means for imposing a tensile force on the handle of the manual pin puller, and said spring for maintaining said tensile force on the handle of the manual pin puller in linear alignment.

6. The pulling tool according to claim 5, said guide member comprising telescoping members.

7. The pulling tool according to claim 3, further including a guide member comprising telescoping members having means captively retaining said screw block in slidable relation thereto, said telescoping members maintaining said means for engaging the handle of the manual pin puller, said means for imposing a tensile force on the handle of the manual pin puller, and said for maintaining said tensile force on the handle of the manual pin puller in linear alignment.

8. The pulling tool according to claim 7, further including a crank handle for manually turning said screw.

9. A pulling tool for maintaining a pulling force on the handle of a manual pin puller of a vehicle trailer, said pulling tool comprising:

a hook for engaging the handle of the manual pin puller of the vehicle trailer;

a screw connected to said hook by a linkage including a spring operably disposed between said screw and said hook;

a screw block disposed about said screw and axially movable relative thereto, whereby rotation of said screw moves said hook selectively toward and apart from said screw block, said spring being subject to a tensile force when said screw block is moved apart from said hook; and a crank handle attached to said screw for rotating said screw by hand.

10. The pulling tool according to claim 9, further comprising a telescoping guide member fixed at one end to said crank handle and at the other end to said hook, said guide member maintaining said screw, said spring, and said hook in linear alignment, said screw and said spring being parallel to said telescoping guide member.

11. The pulling tool according to claim 10, further including a screw clamp attached thereto, for securing said pulling tool to the vehicle trailer.

12. The pulling tool according to claim 11, further including
means for selectively attaching said clamp at different points thereto.

13. The pulling tool according to claim 11, further including means for pivotally attaching said screw clamp thereto.

14. A pulling tool for maintaining a pulling force on the handle of a manual pin puller of a vehicle trailer, said pulling tool, comprising:
a hook for engaging the handle of the manual pin puller of the vehicle trailer;
a screw connected to said hook by a linkage including a spring operably disposed between said screw and said hook;
a screw block disposed about said screw and axially movable relative thereto, whereby rotation of said screw moves said hook selectively toward and apart from said screw block, said spring being subject to a tensile force when said screw block is moved apart from said hook, a crank handle being attached to said screw for manually rotating said screw;
a telescoping guide member fixed at one end to said crank handle and at the other end to said hook, and having means captively and slidably retaining said screw block thereto, said screw and said spring being parallel to said telescoping guide member; and
a screw clamp attached to said pulling tool for removably securing said pulling tool to the vehicle trailer, said pulling tool further including means for pivotally attaching said screw clamp selectively at different points thereto.

* * * * *